US012667907B2

(12) United States Patent
Matsubara et al.

(10) Patent No.: US 12,667,907 B2
(45) Date of Patent: Jun. 30, 2026

(54) COMBINED MACHINING APPARATUS, METHOD TO PERFORM CUTTING AND FRICTION STIR WELDING, AND COMPUTER READABLE STORAGE MEDIUM

(71) Applicant: Yamazaki Mazak Corporation, Niwa-gun (JP)

(72) Inventors: Eiji Matsubara, Niwa-gun (JP); Susumu Kakiuchi, Niwa-gun (JP); Masayasu Minatani, Niwa-gun (JP); Yoshihiko Fujiwara, Niwa-gun (JP)

(73) Assignee: YAMAZAKI MAZAK CORPORATION, Niwa-gun (JP)

( * ) Notice: Subject to any disclaimer, the term of this patent is extended or adjusted under 35 U.S.C. 154(b) by 0 days.

(21) Appl. No.: 19/023,347

(22) Filed: Jan. 16, 2025

(65) Prior Publication Data

US 2025/0153266 A1 May 15, 2025

Related U.S. Application Data

(63) Continuation of application No. PCT/JP2022/034766, filed on Sep. 16, 2022.

(51) Int. Cl.
B23K 20/12 (2006.01)
G05B 19/19 (2006.01)
(Continued)

(52) U.S. Cl.
CPC ................................. B23K 20/123 (2013.01)

(58) Field of Classification Search
CPC .. B23K 20/123; B23K 20/1245; B23K 28/02; G05B 2219/49206; G05B 2219/50245;
(Continued)

(56) References Cited

U.S. PATENT DOCUMENTS 9,266,209 B2 2/2016 Murahashi et al.
10,353,373 B2 7/2019 Suzuki et al.
(Continued)

FOREIGN PATENT DOCUMENTS

CN 109551246 4/2019
EP 2101233 9/2009
(Continued)

OTHER PUBLICATIONS

Supplementary European Search Report for corresponding EP Application No. 22958851.2-1201, Jul. 9, 2025.
(Continued)

*Primary Examiner* — Lawrence Averick
(74) *Attorney, Agent, or Firm* — MORI & WARD, LLP

(57) ABSTRACT

A combined machining apparatus includes a spindle to which a cutting tool and a friction stir welding tool are attachable. The apparatus includes a processor and a memory storing instructions that, when executed by the processor, cause the combined machining apparatus to perform operations comprising: reading a machining program to determine a working tool of a plurality of tools to be called by the machining program; determining whether the working tool is the cutting tool or the friction stir welding tool; allowing correction of a position of the working tool based on a temperature detected by a temperature sensor when the working tool is determined to be the cutting tool; and allowing correction of a position of the working tool based on load detected by the load sensor when the working tool is determined to be the friction stir welding tool.

20 Claims, 14 Drawing Sheets

(51) Int. Cl.
　　*G05B 19/402*　　　(2006.01)
　　*G05B 19/404*　　　(2006.01)
　　*G05B 19/409*　　　(2006.01)
(58) Field of Classification Search
　　CPC .............. G05B 19/404; G05B 2219/49; G05B
　　　　　　　2219/30; G05B 2219/00; B23Q 15/18;
　　　　　　　　　　　　　　　　　　B23P 23/04
　　See application file for complete search history.

(56) References Cited

U.S. PATENT DOCUMENTS

| | | | |
|---|---|---|---|
| 2002/0050508 A1 | 5/2002 | Yoshinaga | |
| 2002/0190103 A1 | 12/2002 | Yoshinaga | |
| 2003/0085257 A1 | 5/2003 | James et al. | |
| 2003/0209586 A1* | 11/2003 | Thompson ........... | B23K 20/123 |
| | | | 228/2.1 |
| 2008/0083817 A1* | 4/2008 | Baumann ............. | B23K 20/123 |
| | | | 228/102 |
| 2009/0230910 A1 | 9/2009 | Hishikawa et al. | |
| 2012/0165971 A1 | 6/2012 | Murahashi et al. | |
| 2017/0185063 A1* | 6/2017 | Suzuki ................... | B23Q 15/04 |
| 2018/0133833 A1 | 5/2018 | Uemura et al. | |
| 2019/0061048 A1* | 2/2019 | Fleck ................... | B23K 20/123 |

FOREIGN PATENT DOCUMENTS

| | | |
|---|---|---|
| EP | 4501531 | 2/2025 |
| JP | 2001-198683 | 7/2001 |
| JP | 2005-508256 | 3/2005 |
| JP | 2010-172981 | 8/2010 |
| JP | 2012-139741 | 7/2012 |
| JP | 6099291 B1 | 3/2017 |
| JP | 2019-063867 | 4/2019 |
| WO | WO 00/02704 | 1/2000 |
| WO | WO 2016/067874 | 5/2016 |
| WO | WO 2017/115401 | 7/2017 |

OTHER PUBLICATIONS

European Office Action for corresponding EP Application No. 22958851.2-1103, Jul. 22, 2025.

International Search Report for corresponding International Application No. PCT/JP2022/034766, Nov. 22, 2022.
Japanese Office Action for corresponding JP Application No. 2023-521603, Jun. 21, 2023 (w/ English machine translation).
Supplementary European Search Report for corresponding EP Application No. 23864950.3-1201, Aug. 6, 2025.
European Office Action for corresponding EP Application No. 23864950.3-1201, Aug. 19, 2025.
Office communication issued by the U.S. Patent and Trademark Office for the U.S. Appl. No. 19/045,554, filed Mar. 18, 2026.
Third party submission under 37 CFR 1.290 as filed for the U.S. Appl. No. 19/045,554, filed Mar. 12, 2026.
Office communication issued by the European Patent Office, together with the Third-Party Observations as filed, for corresponding EP Application No. 22958851.2-1201, Feb. 9, 2026.
Office communication issued by the European Patent Office, with the Third-Party Observations as filed, for corresponding EP Application No. 22958851.2-1201, Feb. 19, 2026.
European Office Action for corresponding EP Application No. No. 22958851.2-1201, Mar. 17, 2026.
Office communication issued by the European Patent Office, with the Third-Party Observations as filed, for EP Application No. 23864950.3-1201. Feb. 12, 2026.
Office communication issued by the European Patent Office, with the Third-Party Observations as filed, for EP Application No. 23864950.3-1201, Feb. 17, 2026.
Information about relevance of the third-party issued by the European Patent Office for the EP Application No. 23864950.3-1201, Feb. 18, 2026.
European Office Action for the EP Application No. No. 23864950. 3-1201, Feb. 23, 2026.
Heidenhain Numeric B.V., Controller manual V420-V500 MillPlus, Apr. 2001.
Andy Ezeilo, Lostir, Development of a Low Cost Processing Unit for Friction Stir Welding, Publishable Final Activity Report, Jan. 2007, TWI Ltd, Contract No. COOP-CT-2004-508587.

* cited by examiner

FIG. 7A

| TNo. | Tool name | Nominal diameter | Suffix | Tool length | *1 | No. | Tool diameter | *2 | No. |
|---|---|---|---|---|---|---|---|---|---|
| 10 | Face mill | 80. | S | 228. |  | 0 | 12. |  | 0 |

*1: Length compensation amount  *2: Diameter compensation amount

FIG. 7B

| TNo. | Tool name | Nominal diameter | Suffix | Tool length | *1 | No. | Probe diameter | Shoulder diameter | *2 | *3 | *4 |
|---|---|---|---|---|---|---|---|---|---|---|---|
| 11 | FSW tool | 12. |  | 228. |  | 0 | 4. | 8. | 0. | 0. | 0. |

*2: Fixed amount compensation Z

*1: Length compensation amount  *2: Fixed amount compensation X  *3: Fixed amount compensation Z
*4: Fixed amount compensation Y

FIG. 11

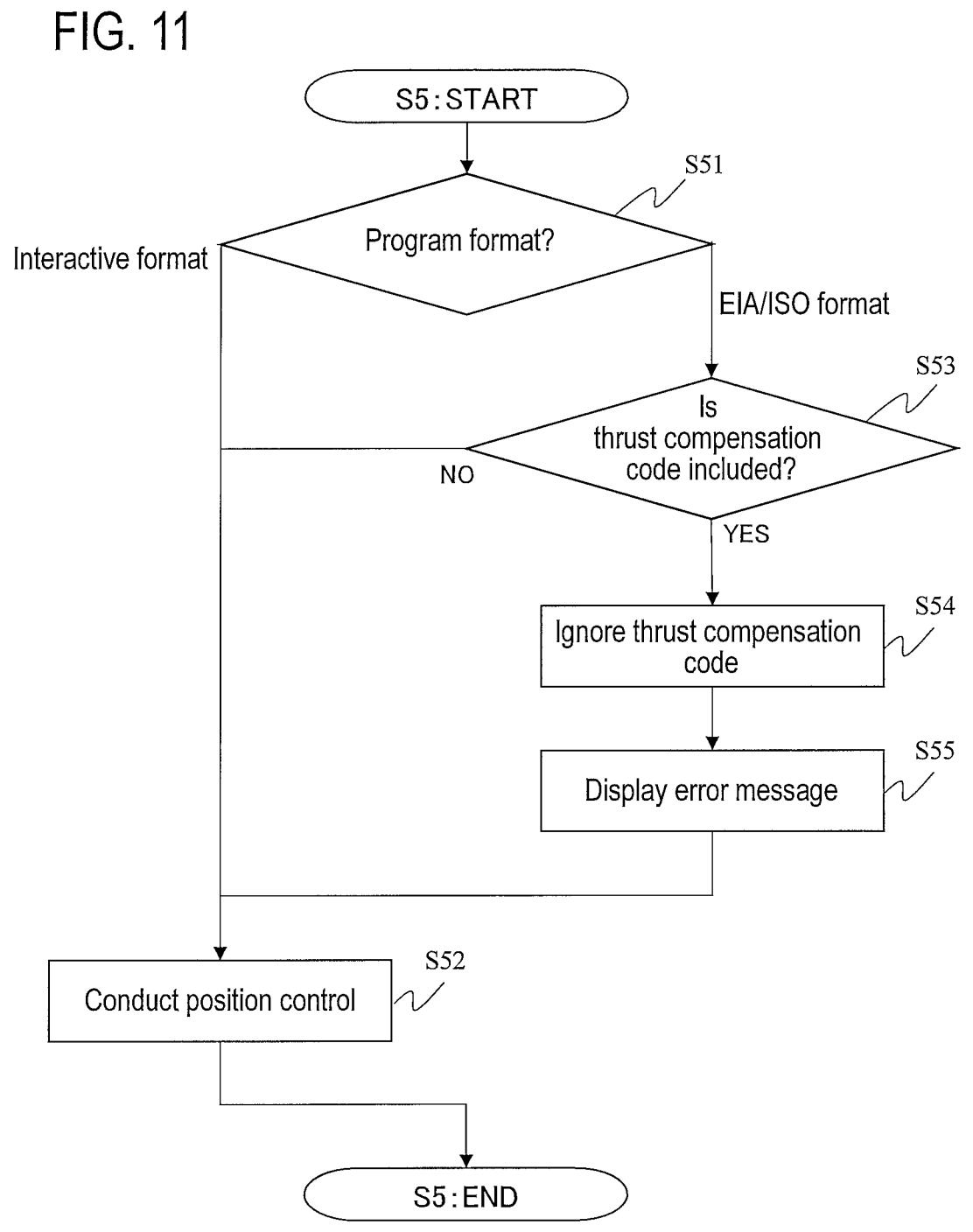

S5 : START

S51

Program format?

Interactive format

EIA/ISO format

S53

Is
thrust compensation
code included?

NO

YES

S54

Ignore thrust compensation
code

S55

Display error message

S52

Conduct position control

S5 : END

FIG. 12A

| UNo. | Unit name | Depth | Cutting allowance -Z | Bottom | Finishing allowance -Z |
|---|---|---|---|---|---|
| 4 | Face mill | 10 | 10 | 1 | 0. |

TS

| SNo. | Tool name | Nominal diameter | No. | Approach-X | Approach-Y | Method | ZFD | Cutting-Z | Cutting-R | Peripheral speed | Feed |
|---|---|---|---|---|---|---|---|---|---|---|---|
| R 1 | Face mill | 80. S | | 445. | -10. | Reciprocate X | ◆ | 2. | 60. | 200. | 1.2 |

SS

| FIG | PTN | P1X/CX | P1Y/CY | P3X/R | P3Y | CN1 | CN2 | CN3 | CN4 |
|---|---|---|---|---|---|---|---|---|---|
| 1 | Square | 400 | 10 | 0 | -300 | | | | |

| UNo. | Unit name | | Welding depth | Insertion amount-Z |
|---|---|---|---|---|
| 5 | Friction stir welding | | 10 | 10 |

| SNo. | Tool name | Nominal diameter | No. | | Approach-X | Approach-Y | | | | Rotational speed | Feed per minute |
|---|---|---|---|---|---|---|---|---|---|---|---|
| R 1 | FSW tool | 12. | | | 445. | -10. | | | | 3000 | 1000 |

SS

| FIG | PTN | X | Y | R/θ | I | J | P | CNR | Thrust control | Thrust |
|---|---|---|---|---|---|---|---|---|---|---|
| 1 | Linear | 400 | 10 | 0 | | | | | Yes | 3300. |

COMBINED MACHINING APPARATUS, METHOD TO PERFORM CUTTING AND FRICTION STIR WELDING, AND COMPUTER READABLE STORAGE MEDIUM

CROSS-REFERENCE TO RELATED APPLICATIONS

The present application is a continuation application of International Application No. PCT/JP2022/034766, filed Sep. 16, 2022. The contents of this application are incorporated herein by reference in their entirety.

BACKGROUND OF THE INVENTION

Field of the Invention

The present invention relates to a combined machining apparatus, a method to perform cutting and friction stir welding, and a computer readable storage medium.

Discussion of the Background

A combined machining apparatus capable of both cutting and friction stir welding is known (for example, JP6099291B). There are two known methods for controlling a machine tool, including position control suitable for the cutting (for example, JP2010-172981A), and thrust control suitable for the friction stir welding (for example, JP2001-198683A).

SUMMARY OF THE INVENTION

According to one aspect of the present invention, a combined machining apparatus includes a spindle, a load sensor, a temperature sensor, a processor, and a memory. A cutting tool and a friction stir welding tool are attachable to the spindle. The load sensor is provided on at least one of the spindle and the friction stir welding tool and configured to detect load which deforms the friction stir welding tool. The temperature sensor is to detect a temperature related to thermal displacement of a position of the cutting tool. The memory stores instructions that, when executed by the processor, cause the combined machining apparatus to perform operations. The operations include reading a machining program to determine a working tool of the plurality of tools to be called by the machining program, and determining whether the working tool is the cutting tool or the friction stir welding tool. The operations include allowing correction of a position of the working tool based on the temperature detected by the temperature sensor when the working tool is determined to be the cutting tool and allowing correction of a position of the working tool based on the load detected by the load sensor when the working tool is determined to be the friction stir welding tool.

According to another aspect of the present invention, a method for controlling carried out by a machine control unit of a combined machining apparatus to perform cutting and friction stir welding, includes reading a command from a machining program to be executed by the combined machining apparatus, the command indicating a working tool to be called by the machining program. The method includes determining whether the working tool is a cutting tool or a friction stir welding tool. The method includes upon determination that the working tool is the cutting tool, allowing correction of a position of the working tool in the cutting, based on a temperature detected by a temperature sensor provided in the combined machining apparatus. The method includes upon determination that the working tool is the friction stir welding tool, obtaining a load applied to the working tool and allowing the correction of the position of the working tool based on the load in the friction stir welding.

According to the other aspect of the present invention, a computer readable storage medium stores a program for causing a machine control unit of the combined machining apparatus to execute processes. The processes include reading a command from a machining program to be executed by the combined machining apparatus, the command indicating a working tool to be called by the machining program. The processes include determining whether the working tool is a cutting tool or a friction stir welding tool, and upon determination that the working tool is the cutting tool, allowing correction of a position of the working tool in the cutting, based on a temperature detected by a temperature sensor provided in the combined machining apparatus, and upon determination that the working tool is the friction stir welding tool, obtaining a load applied to the working tool and allowing the correction of the position of the working tool based on the load in the friction stir welding.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 7A is an example of tool data of a cutting tool;

FIG. 7B is an example of tool data of a friction stir welding tool;

FIG. 11 is a flowchart of detailed operations of step S5;

FIG. 12A is an example of a machining program for cutting;

FIG. 12B is an example of a machining program for friction stir welding;

FIG. 13A is another example of the machining program for the cutting; and

FIG. 13B is another example of the machining program for the friction stir welding.

DESCRIPTION OF THE EMBODIMENTS

Figure 1:
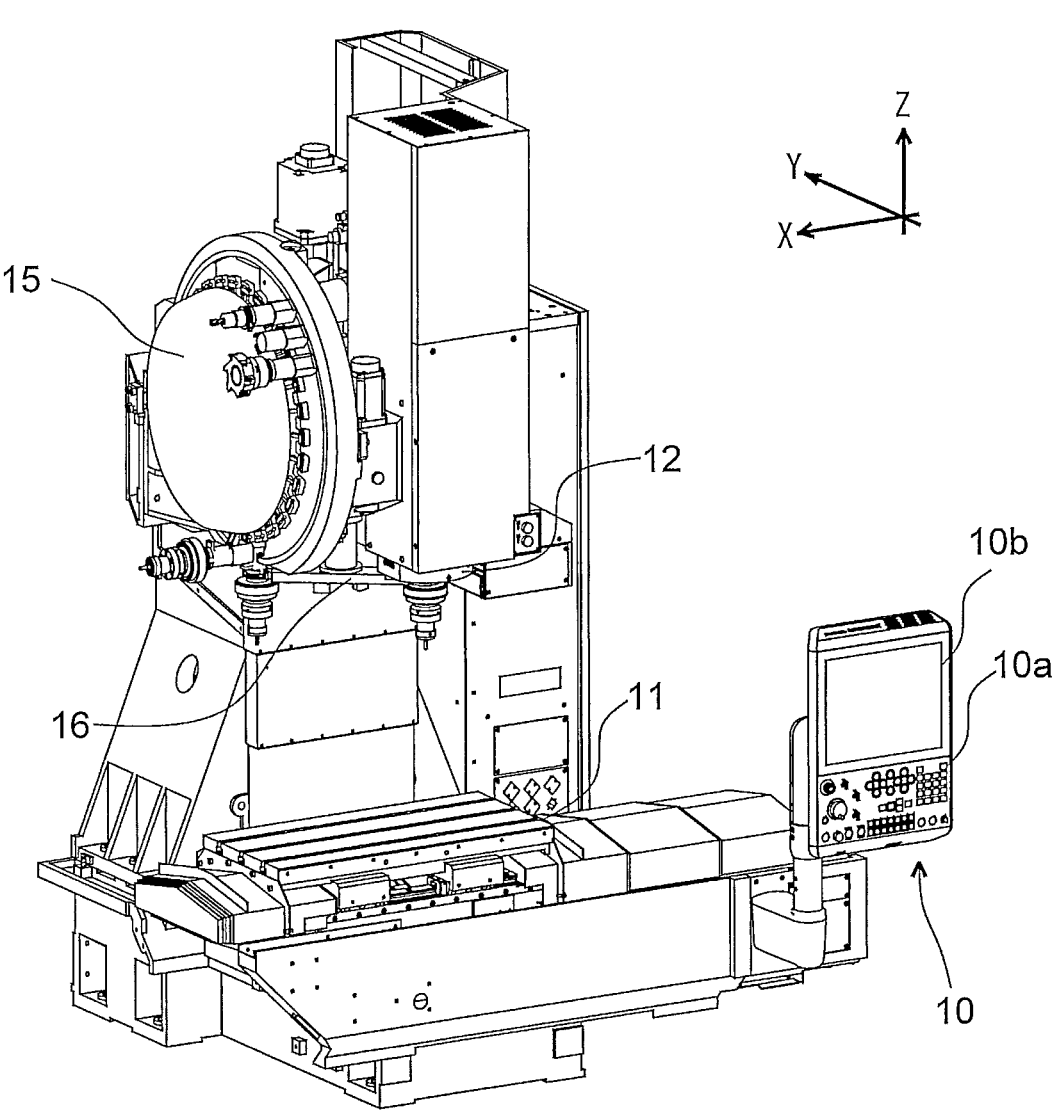
FIG. 1 illustrates an outer appearance configuration of a combined machining apparatus according to an embodiment.

The embodiments will now be described with reference to the accompanying drawings, wherein like reference numerals designate corresponding or identical elements throughout the various drawings.

Embodiments

Configuration of Combined Machining Apparatus 1

Figure 2:
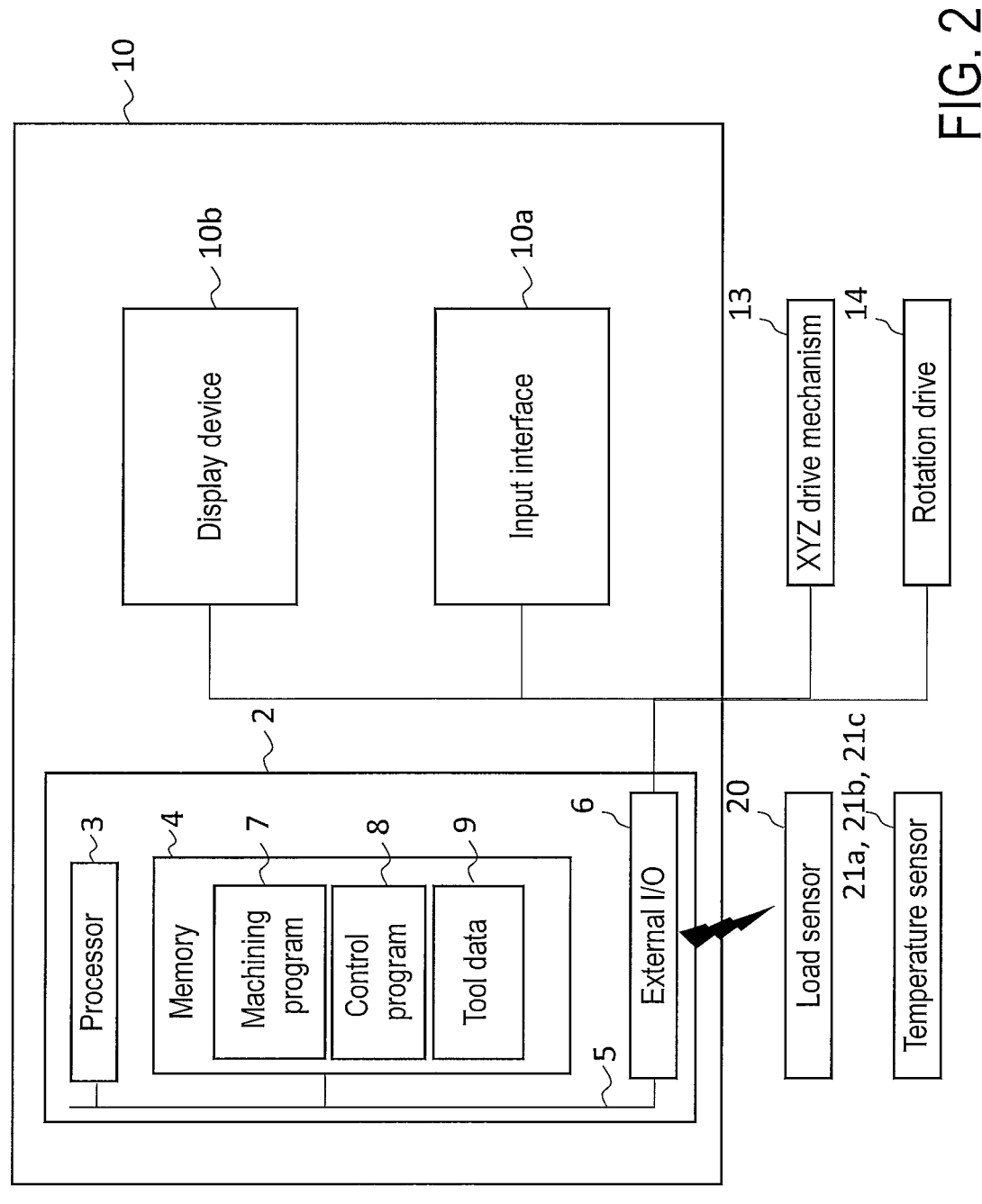
FIG. 2 is a diagram of a configuration of an electronic circuit of the combined machining apparatus according to an embodiment.

FIG. 1 is a perspective view of a combined machining apparatus 1 for cutting and friction stir welding according to an embodiment, illustrating an outer appearance configuration of the combined machining apparatus 1. FIG. 2 is a diagram of a configuration of an electronic circuit of the combined machining apparatus 1 according to an embodiment. As illustrated in FIG. 1, the combined machining apparatus 1 includes: a control panel 10; a machining table 11, which holds a workpiece W (see FIGS. 3 and 4); a machining head 12, which is movable in each of XYZ directions with respect to the workpiece W; a tool magazine 15; and a tool exchanger 16. It is to be noted that although not illustrated in FIG. 1, the combined machining apparatus 1 may further include a cover that covers the above configuration, except for the control panel 10.

Referring to FIG. 2, the control panel 10 includes: a machine control unit 2, which controls the operations of the combined machining apparatus 1; an input interface 10a (user interface 10a), such as a key, a button, a dial, and/or a touch panel, for a user to input a machining condition or the like in the machining control conducted by the machine control unit 2; and a monitor 10b (an example of output device), which displays, for the user, the machining condition and/or detection results of various sensors. The machine control unit 2 includes a hardware processor 3, a memory 4, a bus 5, and an input and output interface 6. The memory 4 stores machining programs 7 including a welding program and a cutting program, control programs 8 for controlling the tools, and tool data 9 in which tool information indicating whether the tool is a cutting tool or a friction stir welding tool is stored. The memory 4 may be referred to as storage means. That is, the storage means is configured to store the tool information. The hardware processor 3 executes various programs. In the following embodiments, the hardware processor 3 may be simply referred to as the processor 3.

Figure 3:
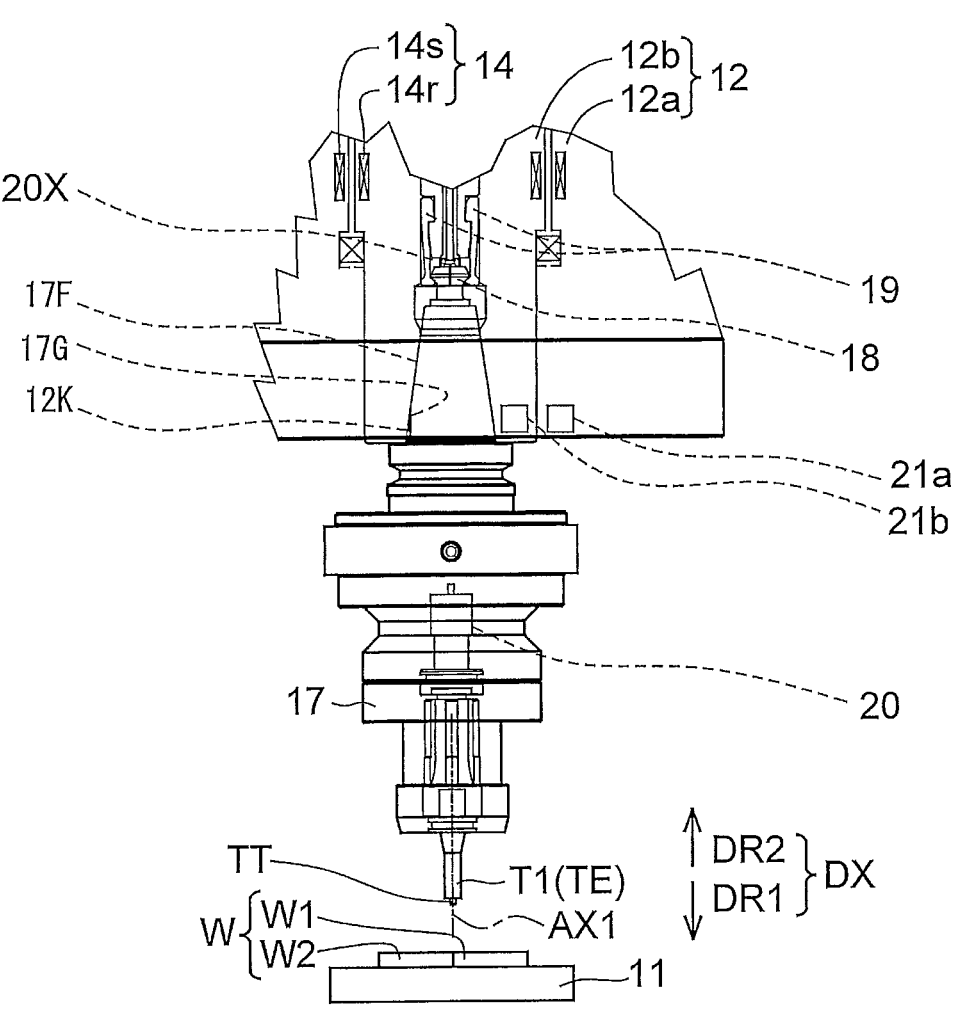
FIG. 3 is a cross-sectional view of an overview of a machining head of the combined machining apparatus illustrated in FIG. 1.
Figure 4:
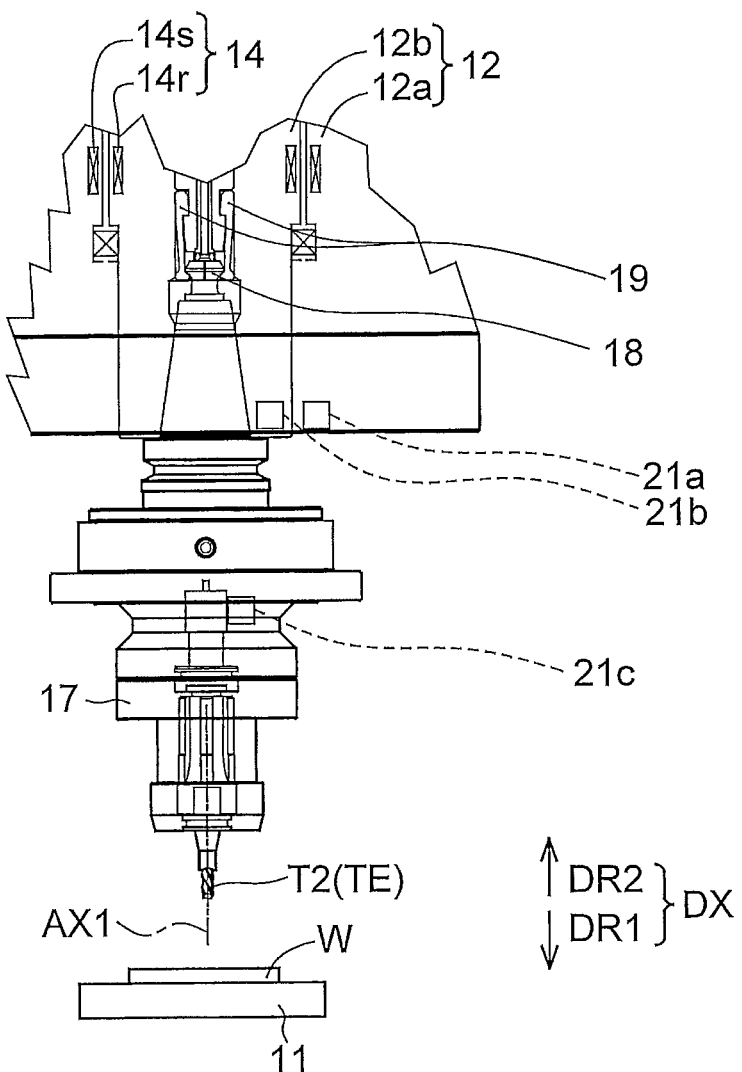
FIG. 4 is a cross-sectional view of an overview of the machining head of the combined machining apparatus illustrated in FIG. 1.

FIGS. 3 and 4 are each a cross-sectional view of an overview of the machining head 12 of the combined machining apparatus 1 illustrated in FIG. 1. As illustrated in FIGS. 3 and 4, the machining head 12 includes: a spindle frame 12a, which is hollow, and which constitutes a housing; and a spindle 12b, which is included in the spindle frame 12a. The spindle frame 12a of the machining head 12 is attached to an XYZ drive mechanism 13, which is illustrated in FIG. 2, and is movable in three-axis directions of XYZ. In addition, one end of the spindle 12b is connected with, for example, a rotation drive 14 such as a motor, and is configured to rotate about a rotation axis AX1. The rotation drive 14 includes: a stator 14s, which is fixed to the spindle frame 12a; and a rotor 14r, which is fixed to the spindle 12b. The XYZ drive mechanism 13 and the rotation drive 14 are connected through the input and output interface 6 with the machine control unit 2.

A tool holder 17 is detachably attached to a lower end of the machining head 12. FIG. 3 illustrates a friction stir welding tool T1 according to an embodiment. The friction stir welding refers to welding two workpieces W1 and W2 together, while a probe TT at a tip end of the tool T1 is being rotated, by inserting the probe TT between the two workpieces W1 and W2 to soften and stir the respective metal materials with frictional heat. FIG. 4 illustrates a cutting tool T2 according to an embodiment. As illustrated in FIGS. 3 and 4, the tools T1 and T2 are held by the tool holder 17.

The tool holder 17 includes: a pull stud 18 on its upper end; and a holder flange 17F, which has a substantially truncated cone shape, and which is connected with the pull stud 18. The holder flange 17F includes a groove portion 17G, which is cut away in a radial direction with respect to the rotation axis AX1 of the spindle 12b. On the other hand, the spindle 12b includes: a collet chuck 19, which can be fit with the pull stud 18; and a key portion 12K, which can be fit with the groove portion 17G. The collet chuck 19 is movable in rotation axis directions DX along the rotation axis AX1 of the spindle 12b. When the collet chuck 19 shifts from the pull stud 18 in a first direction DR1 toward the tool T1 or T2, out of the rotation axis directions DX, the collet chuck 19 is configured to open in the radial direction with respect to the rotation axis AX1, and the pull stud 18 becomes detachable. When the collet chuck 19 shifts from the tool T1 or T2 in a second direction DR2 toward the pull stud 18, out of the rotation axis directions DX, the collet chuck 19 is configured to close in the radial direction with respect to the rotation axis AX1, and is fit with the pull stud 18. The pull stud 18 is fit with the collet chuck 19, and thus the tool holder 17 is fixed to the spindle 12b. In this situation, the key portion 12K of the spindle 12b is fit into the groove portion 17G of the tool holder 17, and thus restricts the rotation of the tool holder 17 with respect to the spindle 12b. Therefore, the cutting tool T2 and the friction stir welding tool T1 are both attachable to the spindle 12b. In the following embodiments, the tool attached to the spindle 12b will be referred to as a working tool TE.

As illustrated in FIG. 3, the friction stir welding tool T1 includes a load sensor 20 such as a load cell. Electric power is supplied to the load sensor 20 by an electromagnetic induction coupler, not illustrated, and the load sensor 20 is capable of transmitting a detected load value to the machine control unit 2 on wireless communication. That is, the input and output interface 6 includes a wireless communication interface. It is to be noted that in the example of FIG. 3, the load sensor 20 is provided on the friction stir welding tool T1, but may be provided on the spindle 12b. FIG. 3 illustrates a sensor 20X as an example of such a load sensor. In addition, by using a load applied to the servo motor of the XYZ drive mechanism 13 for moving the machining head 12, the servo motor may be used as the load sensor 20.

As illustrated in FIGS. 3 and 4, the spindle frame 12a and the spindle 12b include temperature sensors 21a and 21b such as thermocouples. Electric power is supplied to the temperature sensor 21a through wire, and electric power is supplied to the temperature sensor 21b by an electromagnetic induction coupler, not illustrated. The temperature sensors 21a and 21b are each capable of transmitting a value representing the detected temperature to the machine control unit 2 on wireless communication. The temperature sensor 21a may transmit, to the machine control unit 2, the value representing the detected temperature through cable instead of wirelessly. As illustrated in FIG. 4, the cutting tool T2 includes a temperature sensor 21c. Similarly to the load sensor 20, electric power is supplied to the temperature sensor 21c by an electromagnetic induction coupler, not illustrated, and the temperature sensor 21c is capable of transmitting a value representing the detected temperature to the machine control unit 2 on wireless communication. It is to be noted that any of the temperature sensors 21a to 21c may be omitted.

Figure 5:
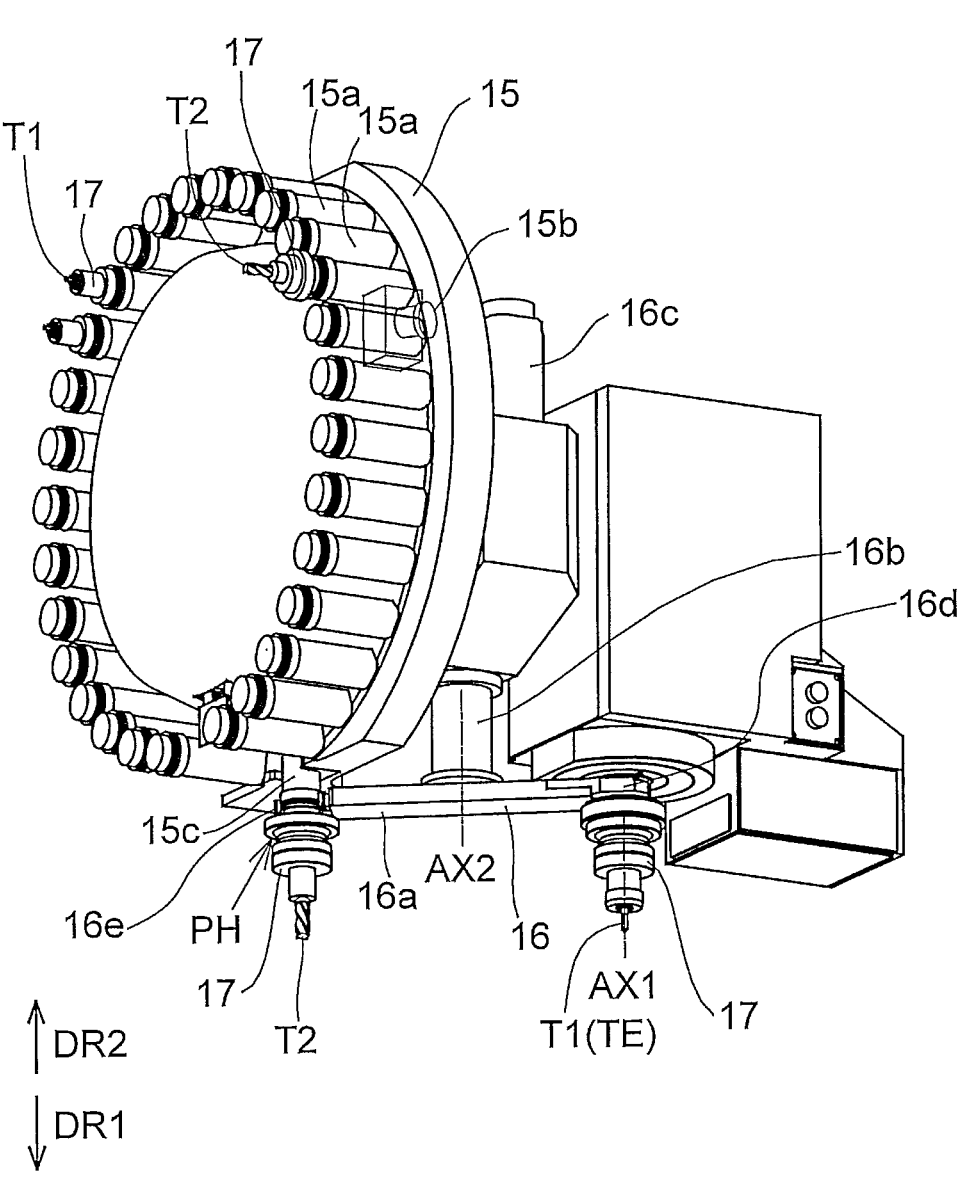
FIG. 5 is an enlarged perspective view of a tool magazine and a tool exchanger.

The tool magazine 15 can storing both the tool holder 17, which holds the friction stir welding tool T1, and the tool holder 17, which holds the cutting tool T2. FIG. 5 is an enlarged perspective view of the tool magazine 15 and the tool exchanger 16. The tool magazine 15 includes: a plurality of holding portions 15a, which respectively hold the plurality of tool holders 17; and a holding portion mover 15b, which moves the plurality of holding portions 15a along a circumferential path. The tool magazine 15 may include a holder remover 15c, which moves the tool holder 17 stored in the tool magazine 15 to a standby position PH, which is accessible from the tool exchanger 16.

The tool exchanger 16 is configured to exchange the tools between the tool magazine 15 and the spindle 12b. The tool exchanger 16 includes a tool exchange arm 16a, an arm rotation device 16b, which rotates the tool exchange arm 16a, and an arm mover 16c, which linearly moves the tool exchange arm 16a. The arm rotation device 16b causes the tool exchange arm 16a to rotate about an additional rotation axis AX2. In addition, the arm mover 16c moves the tool exchange arm 16a in a direction parallel to the additional rotation axis AX2. The tool exchanger 16 includes grip portions 16d and 16e each having a configuration similar to a magic hand capable of gripping the tool holder 17 before and after the tool holder 17 is exchanged.

Operations of Control Program

Figure 6:
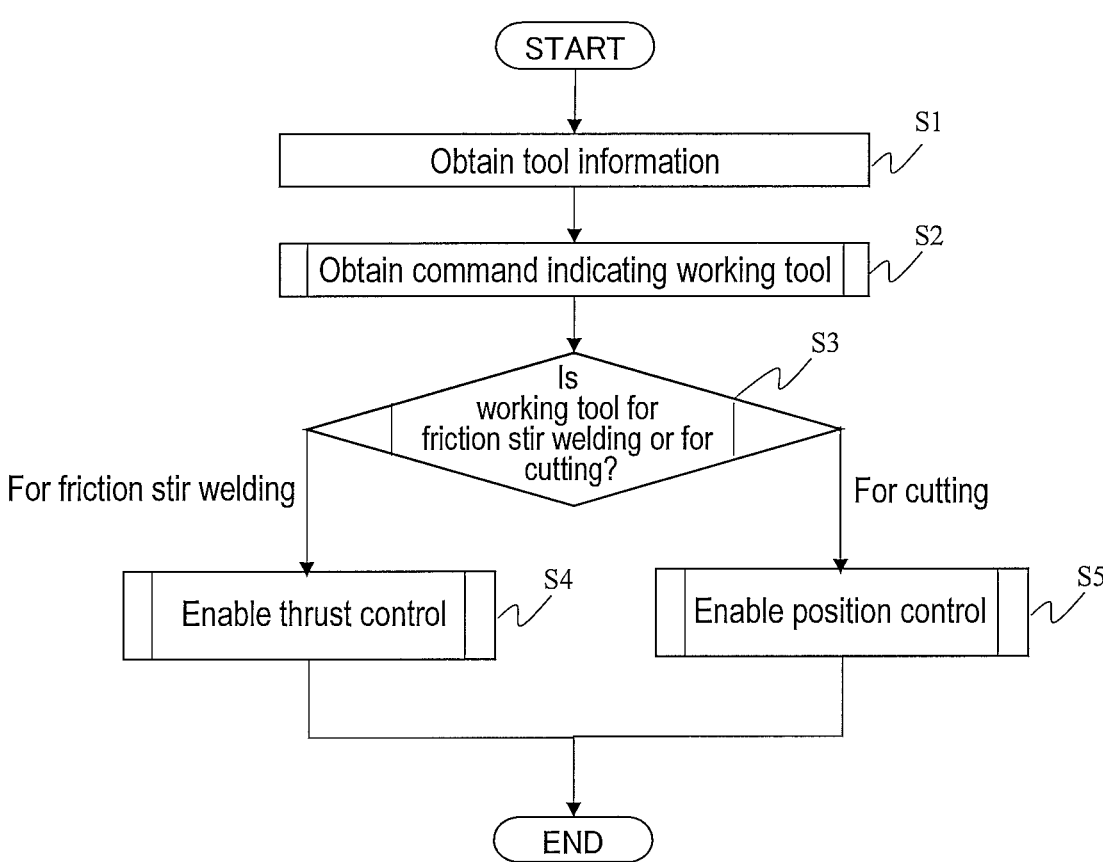
FIG. 6 is a flowchart of a method for controlling the combined machining apparatus, that is, operations of the control program.

Next, operations of the control program 8 in FIG. 2, that is, details of control of the combined machining apparatus 1 will be described. FIG. 6 is a flowchart of a method for controlling the combined machining apparatus 1, that is, the operations of the control program 8. The control program 8 includes commands for causing the hardware processor 3 to perform processing of the method described in FIG. 6 and FIGS. 8 to 11 accompanying FIG. 6, when the control program 8 is executed by the hardware processor 3 of the combined machining apparatus 1. Means for performing the processing of the method described in FIG. 6 and FIGS. 8 to 11 accompanying FIG. 6 includes the control program 8 stored in the memory 4 and the hardware processor 3, which executes the control program 8. Referring to FIG. 6, in step S1, in the method, the processor 3, which executes the control program 8, obtains tool information (tool data 9) indicating whether each of the plurality of tools that are attachable to the combined machining apparatus 1 is the cutting tool T2 or the friction stir welding tool T1. Obtaining the tool information includes reading the tool information from the memory 4 (storage means).

FIG. 7A is an example of the tool data 9 of the cutting tool T2. FIG. 7B is an example of the tool data 9 of the friction stir welding tool T1. It is to be noted that the tool data 9 of the cutting tool T2 may include another parameter for correction. Referring to FIGS. 7A and 7B, TNo. corresponds to a T code. The T code indicates by which holding portion 15a of the plurality of holding portions 15a of the tool magazine 15 the tool holder 17 is held in accordance with the T code. Therefore, different T codes are respectively assigned to the plurality of different holding portions 15a. The T code corresponds to a combination of a tool name, a nominal diameter, and a suffix. Any alphabet can be assigned to the suffix. Therefore, it becomes possible to assign different T codes by changing the suffix, out of the plurality of the same tools.

Whether the tool corresponding to each T code is the friction stir welding tool T1 or the cutting tool T2 can be determined, based on the tool name that is one of the commands indicating the tool. The tool name of the friction stir welding tool T1 is an FSW tool. The tool name of the cutting tool T2 is a name other than the FSW tool. Referring to FIGS. 7A and 7B, in addition to the T code, the tool name, the nominal diameter, and the suffix, the tool data 9 may include another piece of attribute information of the tool such as a tool length, a tool diameter, a probe diameter, or a shoulder diameter (the part of the tool T1 having a larger diameter than the probe TT and to be in contact with the material surface at the time of welding), and/or a correction parameter in consideration of wear of the tool or the like, such as a length correction amount or a diameter correction amount. However, the tool data 9 may not necessarily include information other than the T code, the tool name, the nominal diameter, and the suffix. With regard to whether the tool corresponding to each T code is the friction stir welding tool T1 or the cutting tool T2, the case where the tool name is the FSW tool has been described as one of the commands for the tool. However, as illustrated in FIGS. 7A and 7B, in comparing between the cutting tool and the friction stir welding tool, the friction stir welding tool includes tool-specific items for the friction stir welding, such as the probe diameter and the shoulder diameter. For this reason, in a case where the machining program 7 has a tool-specific item, the processor 3, which executes the control program 8, may determine the tool from the tool-specific item for the friction stir welding as the command indicating the tool, regardless of the tool name.

Next, in step S2 of FIG. 6, in the method, the processor 3, which executes the control program 8, obtains a command indicating a working tool TE to be used in each machining process (to be continuously performed by one tool for the cutting or friction stir welding) to be called by the machining program 7. Such a command is, specifically, a command indicating the tool name. In step S3, in the method, the processor 3, which executes the control program 8, determines whether the working tool TE is the friction stir welding tool T1 or the cutting tool T2, based on the tool information and such a command. More specifically, in a case where the tool name of the working tool TE is the FSW tool, the processor 3, which executes the control program 8, determines that the working tool TE is the friction stir welding tool T1. In a case where the tool name of the working tool TE is a name other than the FSW tool, the processor 3, which executes the control program 8, determines that the working tool TE is the cutting tool T2.

In the method, in step S3, in the case where the processor 3, which executes the control program 8, determines that the working tool TE is the friction stir welding tool T1, the processor 3 enables the correction of the position (thrust control) of the working tool TE based on the load applied to the working tool TE that has been detected by the load sensor 20 (20X), in step S4. In such thrust control, for example, as also disclosed in JP2001-198683A, the processor 3, which executes the control program 8, controls an insertion position of the tool T1 (a position command to be sent to the XYZ drive mechanism 13) so that the load applied to the working tool TE that has been detected by the load sensor 20 (20X) is closer to a target load corresponding to an insertion depth of the tool T1 (that can be obtained from the XYZ drive mechanism 13). Preferably, the correction of the position of the working tool TE based on the load applied to the working tool TE includes feedback control of the position of the working tool TE without a significant change in the load. It is to be noted that the correction of the position of the working tool TE based on the load denotes correction of the position of the working tool TE in the rotation axis direction DX.

In the method, in the case where the processor 3, which executes the control program 8, determines in step S3 that the working tool TE is the cutting tool T2, the processor 3 enables the correction of the position (position control) of the working tool TE based on temperatures that have been detected by the temperature sensors 21a to 21c in the cutting, in step S5. In such position control, for example, as disclosed by WO 2021/044491, a position offset (thermal displacement) from the position of the cutting edge of the working tool TE, in a case where the temperatures detected by the temperature sensors 21a to 21c are each a reference temperature, is estimated, based on the temperatures that have been detected by the temperature sensors 21a to 21c, and the position of the working tool TE is compensated, based on the position offset (thermal displacement) in the cutting. In this case, as disclosed by WO 2021/044491, the position offset may be estimated by multiplying a temperature difference from the reference temperature for every one of the temperature sensors 21a to 21c by a predetermined coefficient and obtaining a sum of multiplication results, or a cutting edge offset corresponding to the temperature difference of each of the temperature sensors 21a to 21c from the reference temperature may be stored in a table or the like, and the position offset may be estimated by referring to the table. It is to be noted that the correction of the position of the working tool TE based on the temperature is intended to mean the correction of the position of the working tool TE in the rotation axis direction DX.

The steps S2, S4, and S5 described above are different depending on the program format of the machining program 7. Hereinafter, specific processing based on the program format of the machining program 7 will be described.

Figure 8:
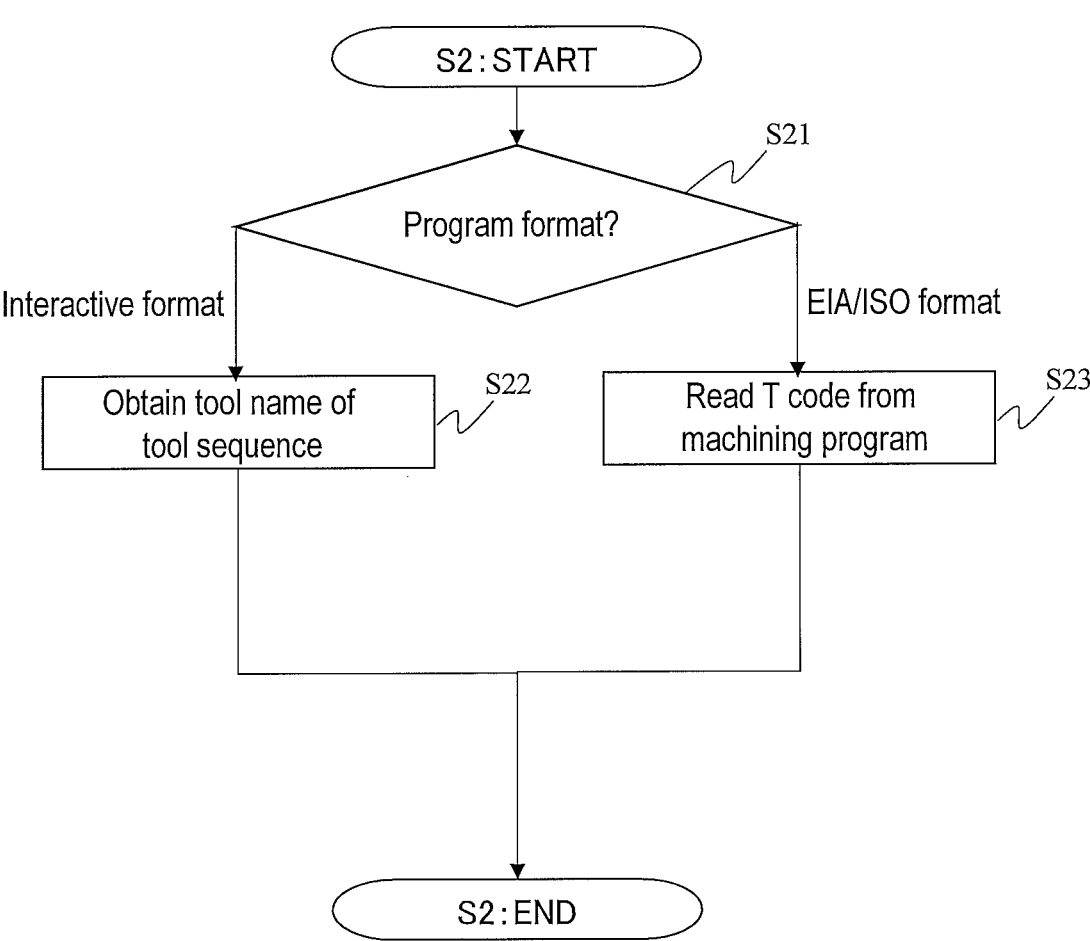
FIG. 8 is a flowchart of detailed operations of step S2.
Figure 9:
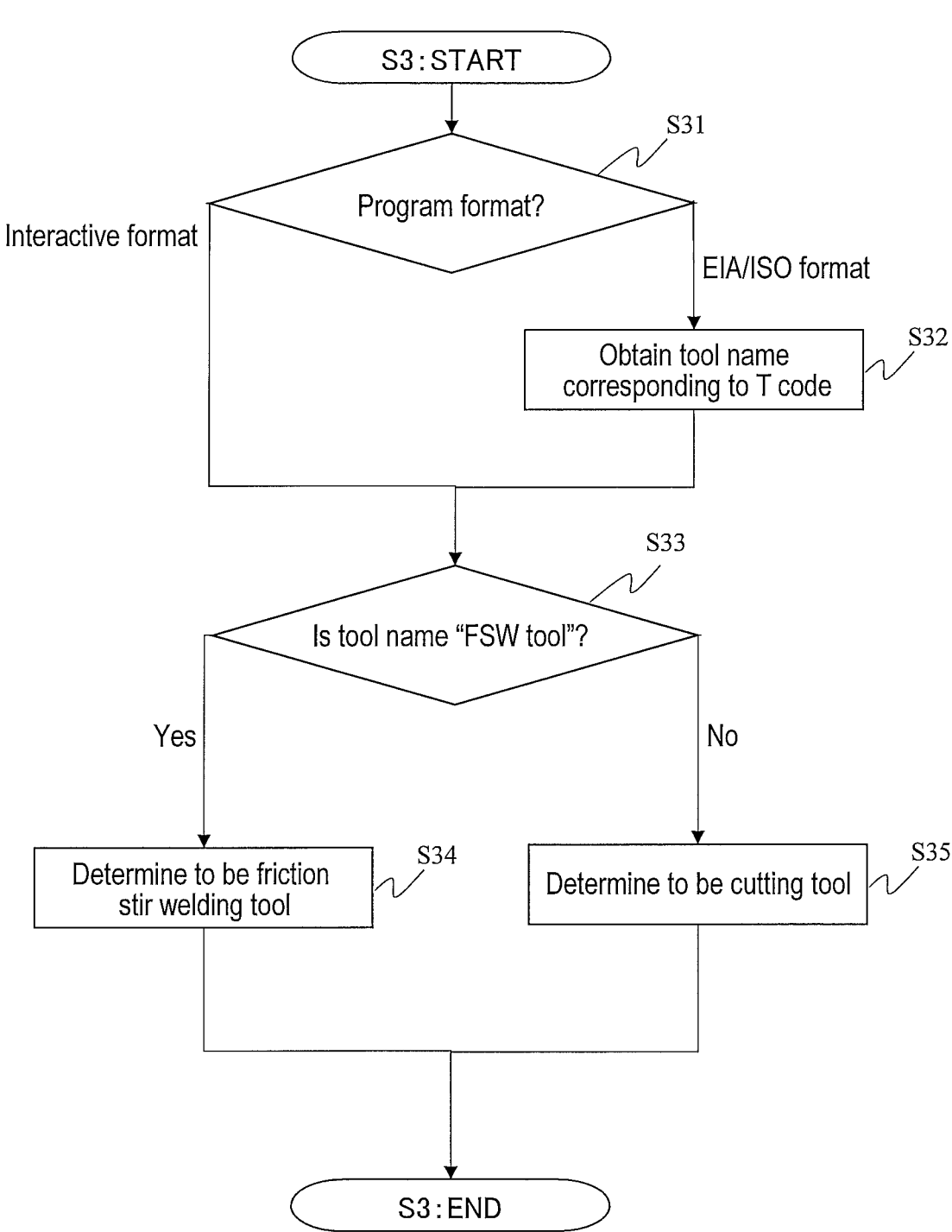
FIG. 9 is a flowchart of detailed operations of step S3.
Figure 10:
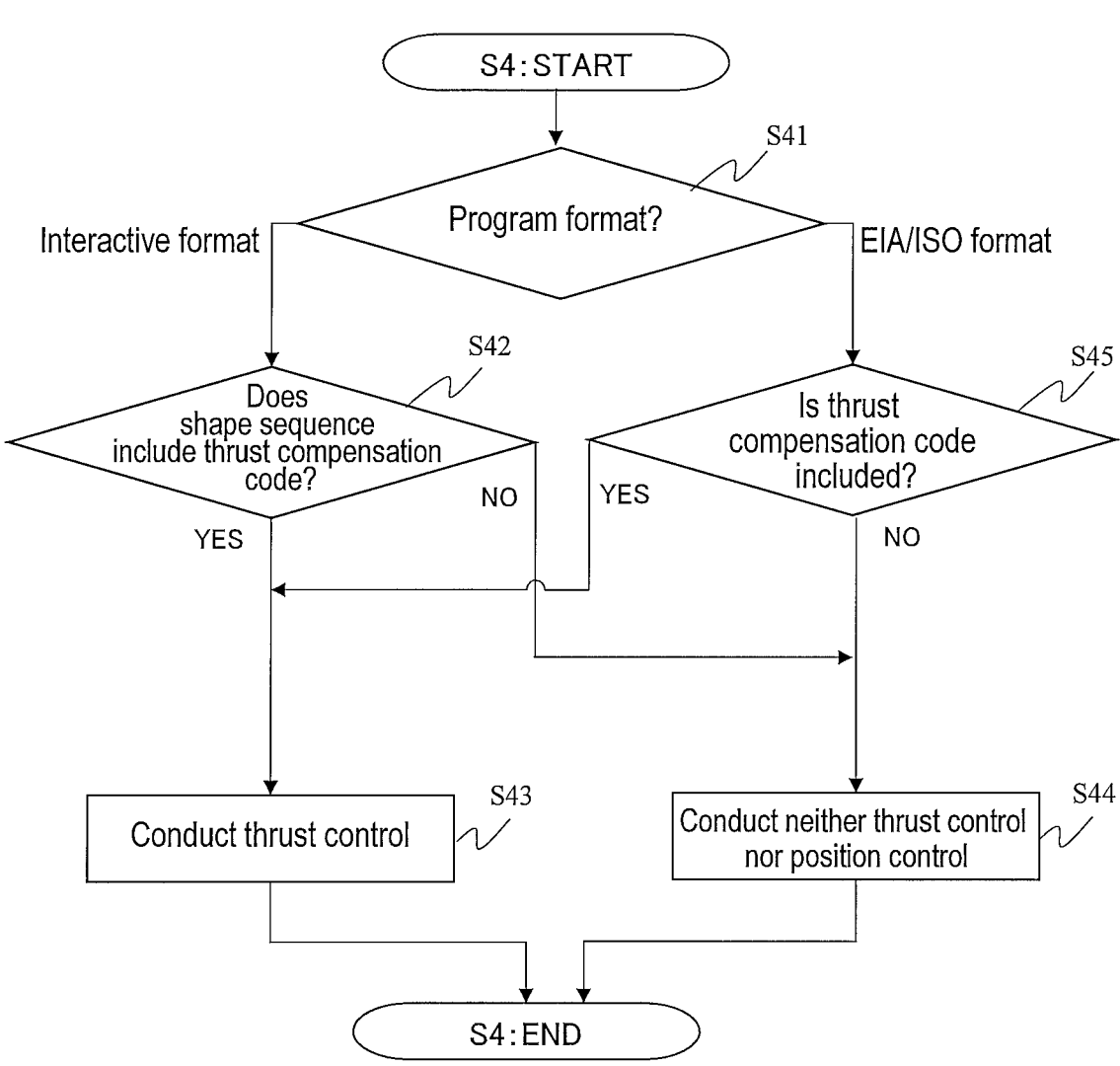
FIG. 10 is a flowchart of detailed operations step S4.

FIG. 8 is a flowchart of detailed operations of step S2. FIG. 9 is a flowchart of detailed operations of step S3. FIG. 10 is a flowchart of detailed operation of step S4. FIG. 11 is a flowchart of detailed operation of step S5. FIG. 12A is an example of the machining program 7 for the cutting. FIG. 12B is an example of the machining program 7 for the friction stir welding. The program format of the machining program 7 of FIGS. 12A and 12B will be referred to as an interactive format. Hereinafter, the machining program 7, which is written in the interactive format, will be referred to as a machining program 7A.

The machining program 7A is written in program codes for numerically controlling the combined machining apparatus 1. At least the following contents are defined in the machining program 7A.

(1) Common unit: Material and shape of pre-machined workpiece W1.

(2) Basic coordinate unit: Method for setting the workpiece coordinate system and the machine coordinate system.

(3) Machining unit: Machining methods and machined shapes of parts of final machined shape.

The common unit, the basic coordinate unit, and the machining unit each include a unit number.

FIGS. 12A and 12B each illustrate only the machining unit of the above-described units. The machining unit includes a unit number UNo., information for identifying a machining content (a unit name), a tool sequence TS for setting of the tool T1 or T2 and cutting conditions of the tool T1 or T2, and a shape sequence SS for specifying a machined shape to be machined in the machining unit. The tool sequence TS means a series of machining stages necessary for forming a machined shape (for example, one bar material, one screw hole) of a part specified in the machining unit. The shape sequence SS means an aggregation of segments defined by a start point and an end point of the cutting edge of a tool in a workpiece coordinate system for determining the machined shape, and a connection relationship indicating how the start point and the end point are connected to each other (such as by way of a line or an arc).

In the examples of FIGS. 12A and 12B, the machining unit includes one tool sequence TS and one shape sequence SS. However, the machining unit may include a plurality of tool sequences. In order to handle a complicated machined shape, the machining unit may include a plurality of shape sequences. In a case where the machining unit includes a plurality of tool sequences and a plurality of shape sequences, in performing the machining unit, first, the tool is moved so as to be capable of generating the shape indicated by all the shape sequences until the next tool sequence appears on the program for every one of the tool sequence in an arranged order of the tool sequences. Each tool sequence is distinguished by a sequence number SNo. Each shape sequence is distinguished by the number written in a FIG item.

In a case where the tool name is the FSW tool in the tool sequence TS, as illustrated in FIG. 12B, each of the shape sequences SS corresponding to the tool sequence TS includes a code ("thrust control") as to whether to conduct the thrust control, and a code ("thrust") that specifies the thrust. In the case of conducting the thrust control, the value of the "thrust control" is "Yes", and in the case of not conducting the thrust control, the value of the "thrust control" is "No". Here, the "thrust control" code including the value "Yes" and a "thrust" code will be collectively referred to as a thrust correction code for instructing the correction of the position of the working tool TE based on the load. In the case where the value of the "thrust control" code of the shape sequence SS is "No", the shape sequence SS defines that the thrust correction code is not included.

Referring to FIGS. 8, 12A, and 12B, in step S2, in the case where the program format is the interactive format in step S21 of FIG. 8, the processor 3, which executes the control program 8 in the method, obtains the tool name of the tool sequence TS as a command indicating the working tool TE, in step S22. It is to be noted that in step S22, as additional processing, in the method, the processor 3, which executes the machining program 7, may obtain the tool name, the nominal diameter, and the suffix of the tool sequence TS, refer to the tool data 9, obtain the T code corresponding to a combination of the tool name, the nominal diameter, and the suffix that have been obtained, and perform processing of attaching the tool holder 17, which is held by the holding portion 15a, and which corresponds to the T code that has been obtained, to the spindle 12b.

In step S3, in the case where the program format is the interactive format in step S31 of FIG. 9, the processor 3, which executes the control program 8 in the method, determines whether the tool name of the tool sequence TS is the FSW tool, in step S33. In a case where the tool name is the FSW tool, the processor 3 determines that the working tool TE is the friction stir welding tool T1 until performing the next tool sequence TS (step S34). As described above, the program code in the interactive format includes a code associated with the thrust control in each shape sequence SS. Therefore, enabling the correction of the position (thrust control) of the working tool TE based on the above-described load includes conducting the correction of the position (thrust control) of the working tool TE based on the load applied to the working tool TE in the friction stir welding with the working tool TE in the machining program 7, in a case where the thrust correction code for instructing the correction of the position of the working tool TE based on the load is included in a part (shape sequence SS) that specifies the machining with the working tool TE in the machining program 7. Specifically, in step S4, in the case where the program format is the interactive format in step S41 of FIG. 10, the processor 3, which executes the control program 8 in the method, determines whether the shape sequence SS includes a thrust correction code, in step S42. In a case where the thrust correction code is included in the shape sequence SS (Yes in step S42), the processor 3, which executes the control program 8 in the method, conducts the thrust control until performing the next shape sequence SS (step S43). On the other hand, in a case where the thrust correction code is not included in the shape sequence SS (No in step S42), the processor 3, which executes the control program 8 in the method, conducts neither the thrust control nor the position control in the part (shape sequence SS) that specifies the machining with the working tool TE in the machining program 7A, in step S44.

In step S3, in the case where the program format is the interactive format in step S31 of FIG. 9, and in the case where the tool name of the tool sequence TS is not the FSW tool in step S33, the processor 3, which executes the control program 8 in the method, determines that the working tool TE is the cutting tool T2 (step S35). In this situation, enabling the correction of the position (position control) of the working tool TE based on the above-described temperatures includes estimating the position offset (thermal displacement) from the position of the cutting edge of the working tool TE in a case where the temperatures detected by the temperature sensors 21a to 21c are each the reference temperature, based on the temperatures that have been detected by the temperature sensors 21a to 21c, and conducting the correction of the position (position control) of the working tool TE based on the position offset (thermal displacement) in the cutting. Specifically, in step S5, in the case where the program format is the interactive format in step S51 of FIG. 11, and in the case where the tool name of the tool sequence TS is not the FSW tool, the processor 3, which executes the control program 8 in the method, conducts the position control in step S52 until performing the next tool sequence TS.

Figures 13A, 13B:
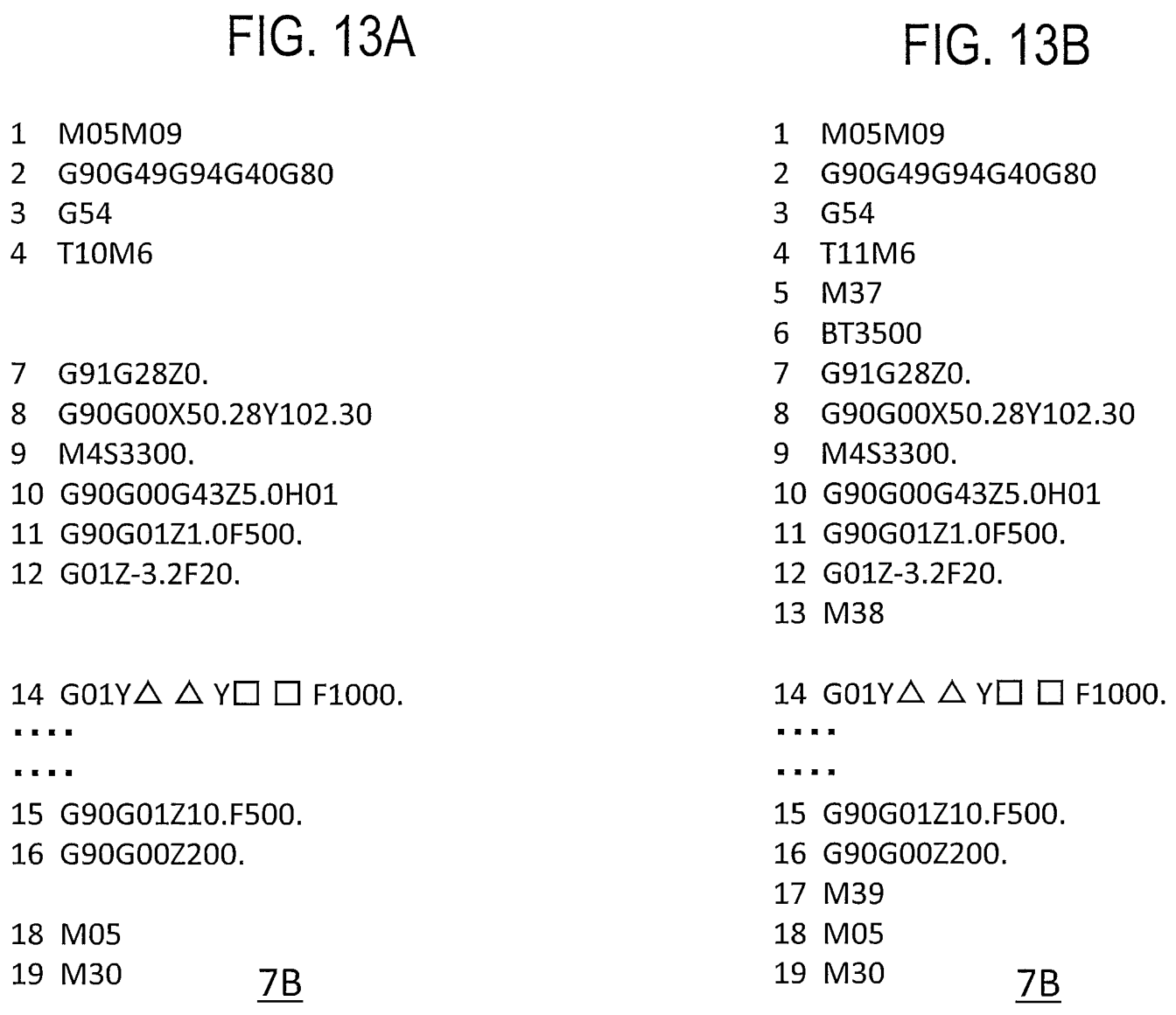

The machining program 7 is not limited to the examples of FIGS. 12A and 12B, and may be a machining program 7 based on Electronic Industries Association (EIA)/International Organization for Standardization (ISO) format. The program format of the machining program 7 of FIGS. 13A and 13B will be referred to as a machining program 7B. FIG. 13A illustrates the machining program 7B with the cutting tool T2, and FIG. 13B illustrates the machining program 7B with the friction stir welding tool T1. Referring to the codes in row numbers 4 of FIGS. 13A and 13B, with regard to the machining program 7B based on the EIA/ISO format, it is possible to determine whether the tool is the friction stir welding tool T1 or the cutting tool T2 from the T code written immediately before an M6 code.

Specifically, in step S2, in the case where the program format is the EIA/ISO format in step S21 of FIG. 8, the processor 3, which executes the control program 8 in the method, obtains the T code as the command indicating the working tool TE from the machining program 7B in step S23. In step S3, in the case where the program format is the EIA/ISO format in step S31 of FIG. 9, the processor 3, which executes the control program 8 in the method, refers to the tool information (tool data 9), and obtains the tool name corresponding to the T code in step S32.

In the example of FIG. 13A, the T code that has been read from the machining program 7B is T10, and the tool name of the working tool TE having the T code of T10 is a face mill with reference to the tool data 9. Thus, it is determined that the working tool TE is the cutting tool T2. That is, in step S33 of FIG. 9, in the case where the tool name of the tool sequence TS is not the FSW tool, the processor 3, which executes the control program 8 in the method, determines that the working tool TE is the cutting tool T2 (step S35). In the example of FIG. 13B, the T code that has been read from the machining program 7B is T11 and the tool name of the working tool TE having the T code of T11 is the FSW tool with reference to the tool data 9. Thus, it is determined that the working tool TE is the cutting tool T2. That is, the hardware processor 3, which executes the control program 8 in the method, determines whether the tool name of the tool sequence TS is the FSW tool in step S33 of FIG. 9, and in the case where the tool name is the FSW tool, the hardware processor 3 determines that the working tool TE is the friction stir welding tool T1 until performing the next tool sequence TS (step S34).

In the programming in the EIA/ISO format, there is no demand for including a special code associated with the position control in the program code. However, there is a demand for including a special code associated with the thrust control in the program code. Referring to FIG. 13B, after a command for being exchanged with the friction stir welding tool T1 in accordance with an M6 code, the machining program 7B with the friction stir welding tool T1 includes an M37 code (a code in a row number 5 of FIG. 13B) that resets the thrust control. When the M37 code is called, the value of the load cell of the M37 code at such a time point is set as the thrust 0. That is, the M37 code specifies an output value of the sensor, the load of which corresponds to 0, out of the values of the load sensor 20 (20X). This makes it possible to ignore the value of a signal when the signal is output due to the influence of assembling the load cell, a temperature rise, or the like. Then, the machining program 7B with the friction stir welding tool T1 includes a BT3500 code (the code of a row number 6 in FIG. 13B) that specifies the thrust. The machining program 7B with the friction stir welding tool T1 includes, subsequent to a code for designating the coordinates, an M38 code (a code of a row number 13 of FIG. 13B) for conducting the thrust control. The machining program 7B with the friction stir welding tool T1 includes, subsequent to a code for moving the friction stir welding tool T2, an M39 code (a code in a row number 17 of FIG. 13B) for releasing the thrust control. Here, the M37 code, the BT3500 code, and the M38 code will be collectively referred to as a thrust correction code for instructing the correction of the position of the working tool TE based on the load.

In the program code in the EIA/ISO format, unless the tool name corresponding to the T code is the FSW tool, the above-described position control is conducted by default. However, in a case where the tool name corresponding to the T code is not the FSW tool and the program code in the EIA/ISO format includes the thrust correction code, the combined machining apparatus 1 displays an error message like "M37 code (alternatively, the BT3500 code, the M38 code, or the M39 code) that is invalid for the program is included, but it was ignored", ignores the thrust correction code, and conducts the position control. In addition, in a case where the tool name corresponding to the T code is the FSW tool and the program code in the EIA/ISO format includes the thrust correction code, the combined machining apparatus 1 conducts the thrust control in accordance with the code. In a case where the tool name corresponding to the T code is the FSW tool and the program code in the EIA/ISO format does not include the thrust correction code, the combined machining apparatus 1 conducts neither the position control nor the thrust control.

The fact that the machining program 7B illustrated in FIG. 13A does not include any code associated with the correction of the position of the working tool TE based on the temperatures that have been detected by the temperature sensors 21a to 21c does not mean that the processor 3, which executes the control program 8, does not conduct the position control. Enabling the correction of the position (position control) of the working tool TE based on the temperatures in the case where the working tool TE is the cutting tool T2 includes estimating the position offset (thermal displacement) from the position of the cutting edge of the working tool TE in the case where the temperatures that have been detected by the temperature sensors 21a to 21c are each the reference temperature based on the temperatures that have been detected by the temperature sensors 21a to 21c, and conducting the correction of the position (position control) of the working tool TE based on the position offset (thermal displacement) in the cutting. Specifically, in step S5, in a case where the program format is the EIA/ISO format in step S51 of FIG. 11 and the code of the machining process to be called by the machining program 7 does not include the thrust correction code (No in step S53), the processor 3, which executes the control program 8 in the method, conducts the position control in the part that specifies the machining with the working tool TE in the machining program 7B in step S52. That is, the processor 3, which executes the control program 8 in the method, conducts the position control until the tool is exchanged with another tool in accordance with the M6 code or the machining program 7B ends in accordance with the M30 code.

On the other hand, for example, as in the case where the T code is not T11 in the code of FIG. 13B, but it is T10, in a case where the program format is the EIA/ISO format in step S51 of FIG. 11 related to step S5 and the code of the machining process to be called by the machining program 7 includes the thrust correction code (Yes in step S53), the processor 3, which executes the control program 8 in the method, ignores the thrust correction code in step S54, even though the thrust correction code for instructing the correction of the position of the working tool TE based on the load is included in the part that specifies the machining with the working tool TE in the machining program 7B. That is, enabling the correction of the position (position control) of the working tool TE based on the temperatures includes ignoring the thrust correction code, even though the thrust correction code for instructing the correction of the position of the working tool TE based on the load is included in the part that specifies the machining with the working tool TE in the machining program 7B. Then, in step S55, the processor 3, which executes the control program 8 in the method, causes the monitor 10b to display an error message. That is, enabling the correction of the position (position control) of the working tool TE based on the temperatures includes notifying the error message, in a case where the thrust correction code for instructing the correction of the position of the working tool TE based on the load is included in the part that specifies the machining with the working tool TE in the machining program 7B. When the processing of step S55 ends, the processor 3, which executes the control program 8 in the method, performs step S52.

In addition, enabling the correction of the position (thrust control) of the working tool TE based on the load applied to the working tool TE in step S4 includes executing the thrust correction code (step S43), in the case where the program format is the EIA/ISO format in step S41 and the thrust correction code is included in the part that specifies the machining with the working tool TE in the machining program 7B (Yes in step S45). Specifically, the processor 3, which executes the control program 8 in the method, conducts the thrust control based on the thrust correction code, after the M38 code is called and until the M39 code or the M30 code is called.

On the other hand, for example, as in the case where the T code is not T10 in the code of FIG. 13A, but it is T11, in a case where the program format is the EIA/ISO format in step S41 of FIG. 9 related to step S4 and the thrust correction code is not included in the machining process code (the part that specifies the machining with the working tool TE in the machining program 7B) to be called by the machining program 7 (No in step S45), the processor 3, which executes the control program 8 in the method, conducts neither the thrust control nor the position control in step S44 in the part that specifies the machining with the working tool TE in the machining program 7B. That is, enabling the correction of the position (thrust control) of the working tool TE based on the load includes conducting neither the correction of the position (thrust control) of the working tool TE based on the load applied to the working tool TE nor the correction of the position (thrust control) of the working tool TE based on the temperatures, unless the thrust correction code is included in the part that specifies the machining with the working tool TE in the machining program 7B. In this situation, the processor 3, which executes the control program 8 in the method, moves the working tool TE, based only on the code for moving the working tool TE (the code of row numbers 14 in FIGS. 13A and 13B).

The control program 8 also has a function of editing the tool information registered in the tool data 9. Specifically, the processor 3, which executes the control program 8 in the method, performs processing of displaying, on the monitor 10b, texts or indicators such as icons corresponding to the items illustrated in the first rows of FIGS. 7A and 7B and an input form such as a text box or a list box corresponding to the contents illustrated in the second rows of FIGS. 7A and 7B. The processor 3, which executes the control program 8 in the method, performs processing of storing, in the memory 4, the information that has been input into the input form by the user via the input interface 10a. That is, the processor 3, which executes the control program 8 in the method, performs processing of storing, in the storing means, the tool information that has been input by the user. It is to be noted that the input interface 10a and the monitor 10b are each an interface (a user interface) for the user to input the tool information.

Features and Effects of Method for Controlling Combined Machining Apparatus According to the Present Embodiment Upon determination that the working tool TE is the cutting tool T2, the combined machining apparatus 1 and the method thereof according to the present embodiment includes enabling correction of the position of the working tool TE in the cutting, based on the temperatures that have been detected by the temperature sensors 21a to 21c, which are provided on the combined machining apparatus 1 or the cutting tool T2. Upon determination that the working tool TE is the friction stir welding tool T1, the combined machining apparatus 1 and the method thereof according to the present embodiment includes enabling correction of the position of the working tool TE in the friction stir welding, based on the load applied to the working tool TE that has been detected by the load sensor 20 (20X), which is provided on either the combined machining apparatus 1 or the friction stir welding tool T1. This enables automatically switching between the position control and the thrust control in accordance with the type of the tool.

Modifications

In the above-described embodiments, the example has been given in which the combined machining apparatus 1 handles both program formats in the interactive format and the EIA/ISO format. However, it may handle only one of the program formats. In such a case, steps S21, S41, and S51 may be omitted in FIGS. 8 to 10, and processing in the program format that the combined machining apparatus 1 does not handle may be omitted.

In the above-described embodiments, the example has been given in which the combined machining apparatus 1 is a vertical machining center. However, also in a combined machining apparatus including a horizontal machining center, a lathe, and an additional manufacturing apparatus, the contents in the present embodiment are applicable, as long as both the cutting and friction stir welding are available.

Some or all of the functions of the logic of the control program 8 of the machine control unit 2 described above may be implemented by a dedicated processor or integrated circuit. The above-described control program 8, without being limited to a program recorded in the memory 4, which is built in the machine control unit 2, may be a program recorded in a storage medium removable from the machine control unit 2 and readable by the machine control unit 2, such as a disk including a floppy disk, an optical disk, a CD-ROM, and a magnetic disk, an SD card, a USB memory, or an external hard disk.

A method according to a first embodiment of the present disclosure is a method for controlling a combined machining apparatus to perform cutting and friction stir welding, and includes obtaining tool information indicating whether each of a plurality of tools attachable to the combined machining apparatus is a cutting tool or a friction stir welding tool. The method includes obtaining a command indicating a working tool of the plurality of tools to be called by a machining program executed by the combined machining apparatus. The method includes determining whether the working tool is the cutting tool or the friction stir welding tool, based on the tool information and the command. The method includes, upon determination that the working tool is the cutting tool, enabling correction of a position of the working tool in the cutting, based on a temperature detected by a temperature sensor provided in the combined machining apparatus. The method includes, upon determination that the working tool is the friction stir welding tool, obtaining a load applied to the working tool and enabling the correction of the position of the working tool based on the load in the friction stir welding.

According to a second embodiment of the present disclosure, in the method according to the first embodiment, obtaining the load applied to the working tool includes obtaining the load detected by a load sensor provided on either the combined machining apparatus or the friction stir welding tool. It is to be noted that a thrust correction code for instructing the correction of the position of the working tool based on the load preferably includes a code that specifies the output value of the sensor corresponding to the load 0, out of the values of the load sensor.

According to a third embodiment of the present disclosure, in the method according to the first embodiment or the second embodiment, the correction of the position of the working tool based on the load is correction of a position in a rotation axis direction of the working tool.

According to a fourth embodiment of the present disclosure, in the method according to one of the first embodiment to the third embodiment, enabling the correction of the position of the working tool based on the temperature includes estimating a position offset from a position of a cutting edge of the working tool in a case where the temperature detected by the temperature sensor is a reference temperature, based on the temperature detected by the temperature sensor, and performing the correction of the position of the working tool in the cutting, based on the position offset.

According to a fifth embodiment of the present disclosure, in the method according to one of the first embodiment to the fourth embodiment, enabling the correction of the position of the working tool based on the temperature includes ignoring a thrust correction code, even though the thrust correction code for instructing the correction of the position of the working tool based on the load is included in a part that specifies machining with the working tool in the machining program.

According to a sixth embodiment of the present disclosure, in the method according to the fifth embodiment, enabling the correction of the position of the working tool based on the temperature includes notifying an error message, in a case where a thrust correction code for instructing the correction of the position of the working tool based on the load is included in the part that specifies the machining with the working tool in the machining program.

According to a seventh embodiment of the present disclosure, in the method according to one of the first embodiment to the sixth embodiment, enabling the correction of the position of the working tool based on the load includes executing a thrust correction code, in a case where the thrust correction code for instructing the correction of the position of the working tool based on the load is included in a part that specifies machining with the working tool in the machining program.

According to an eighth embodiment of the present disclosure, in the method according to the seventh embodiment, enabling the correction of the position of the working tool based on the load includes performing neither the correction of the position of the working tool based on the load applied to the working tool nor the correction of the position of the working tool based on the temperature, unless the thrust correction code is included in the part that specifies the machining with the working tool in the machining program.

According to a ninth embodiment of the present disclosure, the method according to one of the first embodiment to the eighth embodiment further includes storing, in a storing means, the tool information input by a user. Obtaining the tool information includes reading the tool information from the storing means.

According to a tenth embodiment of the present disclosure, in the method according to one of the first embodiment to the ninth embodiment, the correction of the position of the working tool based on the load applied to the working tool includes performing feedback control of the position of the working tool without a significant change in the load.

A program according to an eleventh embodiment of the present disclosure includes an instruction for causing a hardware processor to perform processing of the method according to one of the first embodiment to the tenth embodiment, when the hardware processor of the combined machining apparatus performs the processing.

A combined machining apparatus according to a twelfth embodiment of the present disclosure includes: means for performing the method according to one of the first embodiment to the tenth embodiment; a storing means configured to store the tool information; a spindle to which the cutting tool and the friction stir welding tool are both attachable; a load sensor provided on at least one of the spindle and the friction stir welding, the load sensor being configured to detect the load; and the temperature sensor.

According to a thirteenth embodiment of the present disclosure, the combined machining apparatus according to the twelfth embodiment further includes: a tool magazine capable of storing both the cutting tool and the friction stir welding tool; and a tool exchanger configured to exchange tools between the tool magazine and the spindle.

According to a fourteenth embodiment of the present disclosure, the combined machining apparatus according to the twelfth embodiment or the thirteenth embodiment further includes an interface for a user to input the tool information.

According to a fifteenth embodiment of the present disclosure, in the combined machining apparatus according to one of the twelfth embodiment to the fourteenth embodiment, the storing means is a memory. Means for performing processing of the method according to one of the first embodiment to the tenth embodiment includes the program according to the eleventh embodiment stored in the memory, and a hardware processor that executes the program.

In the method according to the first embodiment, the program according to the eleventh embodiment for causing the hardware processor to perform the processing of the method according to the first embodiment, and the combined machining apparatus according to the twelfth embodiment including the means for performing the processing of the method according to the first embodiment, upon determination that the working tool is the cutting tool, the correction of the position of the working tool based on the temperature, that is, the position control is enabled, and upon determination that the working tool is the friction stir welding tool, the correction of the position of the working tool based on the load, that is, the thrust control is enabled. This enables automatically switching between the position control and the thrust control in accordance with the type of the tool.

In the method according to the second embodiment, the program according to the eleventh embodiment for causing the hardware processor to perform the processing of the method according to the second embodiment, and the combined machining apparatus according to the twelfth embodiment including the means for performing the processing of the method according to the second embodiment, the load applied to the working tool is detected by the load sensor provided on either the combined machining apparatus or the friction stir welding tool, and thus the load applied to the working tool can be detected with high accuracy. In addition, in a case where the thrust correction code for instructing the correction of the position of the working tool based on the load includes a code that specifies the output value of the sensor corresponding to the load 0, out of the values of the load sensor, the value of the signal can be ignored, when the signal is output from the load sensor due to the influence of assembling a load cell, a temperature rise, or the like.

In the method according to the third embodiment, the program according to the eleventh embodiment for causing the hardware processor to perform the processing of the method according to the third embodiment, and the combined machining apparatus according to the twelfth embodiment including the means for performing the processing of the method according to the third embodiment, the position correction in the rotation axis direction efficiently reduces cutting edge resistance, and the machining quality can be improved.

In the method according to the fourth embodiment, the program according to the eleventh embodiment for causing the hardware processor to perform the processing of the method according to the fourth embodiment, and the combined machining apparatus according to the twelfth embodiment including the means for performing the processing of the method according to the fourth embodiment, in the case where the working tool is the cutting tool, the cutting edge position of the working tool based on the temperature is performed, so that the machining quality in the cutting can be improved.

In the method according to the fifth embodiment, the program according to the eleventh embodiment for causing the hardware processor to perform the processing of the method according to the fifth embodiment, and the combined machining apparatus according to the twelfth embodiment including the means for performing the processing of the method according to the fifth embodiment, in the case where the working tool is the cutting tool, the code of the thrust control is ignored. Even though the thrust control code is erroneously input into the program, the position control essentially necessary for the cutting is enabled. As a result, the machining quality of the cutting can be improved.

In the method according to the sixth embodiment, the program according to the eleventh embodiment for causing the hardware processor to perform the processing of the method according to the sixth embodiment, and the combined machining apparatus according to the twelfth embodiment including the means for performing the processing of the method according to the sixth embodiment, in the case where the working tool is the cutting tool, if the thrust control code is erroneously input into the program, an error message will be displayed. Thus, the user is able to notice that the user has input an invalid code, and user experience can be improved.

In the method according to the seventh embodiment, the program according to the eleventh embodiment for causing the hardware processor to perform the processing of the method according to the seventh embodiment, and the combined machining apparatus according to the twelfth embodiment including the means for performing the processing of the method according to the seventh embodiment, in the case where the working tool is the friction stir welding tool, the thrust correction code makes it possible to define conducting of the thrust control, so that the user can freely determine whether to conduct the thrust control.

In the method according to the eighth embodiment, the program according to the eleventh embodiment for causing the hardware processor to perform the processing of the method according to the eighth embodiment, and the combined machining apparatus according to the twelfth embodiment including the means for performing the processing of the method according to the eighth embodiment, in the case where the working tool is the friction stir welding tool, it is possible to configure that neither the position control nor the thrust control is conducted without the thrust correction code, so that the user can selectively execute an original code of the program.

In the method according to the ninth embodiment, the program according to the eleventh embodiment for causing the hardware processor to perform the processing of the method according to the ninth embodiment, and the combined machining apparatus according to the twelfth embodiment including the means for performing the processing of the method according to the ninth embodiment, the user registers, in the storing means, whether a new tool is a cutting tool or a friction stir welding tool, and the combined machining apparatus is capable of automatically determining whether the new tool is the cutting tool or the friction stir welding tool, based on the information registered in the storing means.

In the method according to the tenth embodiment, the program according to the eleventh embodiment for causing the hardware processor to perform the processing of the method according to the tenth embodiment, and the combined machining apparatus according to the twelfth embodiment including the means for performing the processing of the method according to the tenth embodiment, the thrust control can be conducted to make the thrust constant, so that the machining quality of the friction stir welding can be improved.

In the combined machining apparatus according to the thirteenth embodiment, the cutting tool and the friction stir welding tool can be stored without distinguishing the type of the tool, and thus tool storage pockets of a tool magazine can be effectively utilized. Furthermore, the cutting tool and the friction stir welding tool can be mechanically exchanged, so that the manufacturing process that enables automation can be increased.

In the combined machining apparatus according to the fourteenth embodiment, the user is able to input the tool information from the combined machining apparatus, and thus the registration work of the tool information is facilitated. In addition, it becomes possible to confirm whether the tool is the cutting tool or the friction stir welding tool from the tool information. This eliminates the need for confirming what tool is attached to the tool magazine of the combined machining apparatus, and facilitates creation and correction of the program.

In the combined machining apparatus according to the fifteenth embodiment, the control according to the first embodiment to the tenth embodiment can be conducted by a general-purpose architecture, and the manufacturing cost of the combined machining apparatus can be reduced.

The technique disclosed in the present application provides a combined machining apparatus, a method for controlling the combined machining apparatus, and a program capable of automatically switching between position control and thrust control in accordance with the type of a tool.

As used herein, the term "comprise" and its variations are intended to mean open-ended terms, not excluding any other elements and/or components that are not recited herein. The same applies to the terms "include", "have", and their variations.

As used herein, a component suffixed with a term such as "member", "portion", "part", "element", "body", and "structure" is intended to mean that there is a single such component or a plurality of such components.

As used herein, ordinal terms such as "first" and "second" are merely used for distinguishing purposes and there is no other intention (such as to connote a particular order) in using ordinal terms. For example, the mere use of "first element" does not connote the existence of "second element"; otherwise, the mere use of "second element" does not connote the existence of "first element".

As used herein, approximating language such as "approximately", "about", and "substantially" may be applied to modify any quantitative representation that could permissibly vary without a significant change in the final result obtained. All of the quantitative representations recited in the present application shall be construed to be modified by approximating language such as "approximately", "about", and "substantially".

As used herein, the phrase "at least one of A and B" is intended to be interpreted as "only A", "only B", or "both A and B".

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. A combined machining apparatus comprising:
 a spindle to which a cutting tool and a friction stir welding tool are attachable;
 a load sensor provided on at least one of the spindle and the friction stir welding tool, the load sensor being configured to detect load which deforms the friction stir welding tool;
 a temperature sensor configured to detect a temperature related to thermal displacement of a position of the cutting tool;
 a user interface via which tool information is received from a user, the tool information indicating whether each of a plurality of tools attachable to the combined machining apparatus is a cutting tool or a friction stir welding tool;
 a processor; and
 a memory storing the tool information and instructions that, when executed by the processor, cause the combined machining apparatus to perform operations comprising:
  reading a machining program to determine a working tool to be called by the machining program;
  reading the tool information from the memory to determine whether the working tool is the cutting tool or the friction stir welding tool;
  allowing correction of a position of the working tool based on the temperature detected by the temperature sensor when the working tool is determined to be the cutting tool; and
  allowing correction of a position of the working tool based on the load detected by the load sensor when the working tool is determined to be the friction stir welding tool.

2. The combined machining apparatus according to claim 1,
 wherein the operations further comprise disallowing the correction of the position of the working tool based on the temperature when the working tool is determined to be the friction stir welding tool.

3. The combined machining apparatus according to claim 2,
 wherein the allowing the correction of the position of the working tool based on the load includes performing the correction of the position of the working tool based on the load if a thrust correction code for instructing the correction of the position of the working tool based on the load exists in a part of the machining program that specifies machining with the working tool and not performing the correction of the position of the working tool based on the load if the thrust correction code does not exist in the part of the machining program.

4. The combined machining apparatus according to claim 3,
 wherein the allowing the correction of the position of the working tool based on the temperature includes outputting an error message, in a case where a thrust correction code for instructing the correction of the position of the working tool based on the load is included in the part of the machining program that specifies the machining with the working tool.

5. The combined machining apparatus according to claim 1, wherein the allowing the correction of the position of the working tool based on the temperature includes ignoring a thrust correction code for instructing the correction of the position of the working tool based on the load, even though the thrust correction code exists in a part of the machining program that specifies machining with the working tool.

6. The combined machining apparatus according to claim 1, wherein the allowing the correction of the position of the working tool based on the temperature includes executing the correction of the position of the working tool based on the temperature.

7. The combined machining apparatus according to claim 1, wherein the correction of the position of the working tool based on the load is correction of the position of the working tool in a direction along a rotation axis of the working tool.

8. The combined machining apparatus according to claim 1, wherein the correction of the position of the working tool based on the load applied to the working tool includes performing feedback control of the position of the working tool without a significant change in the load.

9. A combined machining apparatus comprising:

a spindle to which a cutting tool and a friction stir welding tool are attachable;

a load sensor provided on at least one of the spindle and the friction stir welding tool, the load sensor being configured to detect load which deforms the friction stir welding tool;

a temperature sensor configured to detect a temperature related to thermal displacement of a position of the cutting tool;

a processor; and a memory storing instructions that, when executed by the processor, cause the combined machining apparatus to perform operations comprising:

reading a machining program to determine a working tool to be called by the machining program;

determining whether the working tool is the cutting tool or the friction stir welding tool;

allowing correction of a position of the working tool based on the temperature detected by the temperature sensor when the working tool is determined to be the cutting tool; and allowing correction of a position of the working tool based on the load detected by the load sensor when the working tool is determined to be the friction stir welding tool, wherein the correction of the position of the working tool based on the temperature includes estimating a position offset from a position of a cutting edge of the working tool in a case where the temperature detected by the temperature sensor is a reference temperature, based on the temperature detected by the temperature sensor, and correcting the position of the working tool in the cutting, based on the position offset.

10. The combined machining apparatus according to claim 9, wherein the operations further comprise disallowing the correction of the position of the working tool based on the temperature when the working tool is determined to be the friction stir welding tool.

11. The combined machining apparatus according to claim 10, wherein the allowing the correction of the position of the working tool based on the load includes performing the correction of the position of the working tool based on the load if a thrust correction code for instructing the correction of the position of the working tool based on the load exists in a part of the machining program that specifies machining with the working tool and not performing the correction of the position of the working tool based on the load if the thrust correction code does not exist in the part of the machining program.

12. The combined machining apparatus according to claim 11, wherein the allowing the correction of the position of the working tool based on the temperature includes outputting an error message, in a case where a thrust correction code for instructing the correction of the position of the working tool based on the load is included in the part of the machining program that specifies the machining with the working tool.

13. The combined machining apparatus according to claim 9, wherein the allowing the correction of the position of the working tool based on the temperature includes ignoring a thrust correction code for instructing the correction of the position of the working tool based on the load, even though the thrust correction code exists in a part of the machining program that specifies machining with the working tool.

14. The combined machining apparatus according to claim 9, wherein the allowing the correction of the position of the working tool based on the temperature includes executing the correction of the position of the working tool based on the temperature.

15. A combined machining apparatus comprising:

a spindle to which a cutting tool and a friction stir welding tool are attachable;

a load sensor provided on at least one of the spindle and the friction stir welding tool, the load sensor being configured to detect load which deforms the friction stir welding tool;

a temperature sensor configured to detect a temperature related to thermal displacement of a position of the cutting tool;

a tool magazine configured to store the cutting tool and the friction stir welding tool;

a tool exchanger configured to exchange tools between the tool magazine and the spindle;

a processor; and a memory storing instructions that, when executed by the processor, cause the combined machining apparatus to perform operations comprising:

reading a machining program to determine a working tool to be called by the machining program;

determining whether the working tool is the cutting tool or the friction stir welding tool;

allowing correction of a position of the working tool based on the temperature detected by the temperature sensor when the working tool is determined to be the cutting tool; and allowing correction of a position of the working tool based on the load detected by the load sensor when the working tool is determined to be the friction stir welding tool.

16. The combined machining apparatus according to claim 15, wherein the operations further comprise disallowing the correction of the position of the working tool based on the temperature when the working tool is determined to be the friction stir welding tool.

17. The combined machining apparatus according to claim 16, wherein the allowing the correction of the position of the working tool based on the load includes performing the correction of the position of the working tool based on the load if a thrust correction code for instructing the correction of the position of the working tool based on the load exists in a part of the machining program that specifies machining with the working tool and not performing the correction of the position of the working tool based on the load if the thrust correction code does not exist in the part of the machining program.

18. The combined machining apparatus according to claim 15, wherein the allowing the correction of the position of the working tool based on the temperature includes ignoring a thrust correction code for instructing the correction of the position of the working tool based on the load, even though the thrust correction code exists in a part of the machining program that specifies machining with the working tool.

19. The combined machining apparatus according to claim 17, wherein the allowing the correction of the position of the working tool based on the temperature includes outputting an error message, in a case where a thrust correction code for instructing the correction of the position of the working tool based on the load is included in the part of the machining program that specifies the machining with the working tool.

20. The combined machining apparatus according to claim 15, wherein the allowing the correction of the position of the working tool based on the temperature includes executing the correction of the position of the working tool based on the temperature.

* * * * *